US008769324B2

(12) United States Patent
Narushima et al.

(10) Patent No.: US 8,769,324 B2
(45) Date of Patent: Jul. 1, 2014

(54) POWER SUPPLY CONTROL DEVICE, IMAGE PROCESSING DEVICE, POWER SUPPLY CONTROL METHOD, AND COMPUTER READABLE MEDIUM

(75) Inventors: Kazuhiko Narushima, Kanagawa (JP); Motofumi Baba, Kanagawa (JP); Masafumi Ono, Kanagawa (JP); Mitsunobu Mamiya, Kanagawa (JP); Kenji Kuroishi, Kanagawa (JP); Masato Ishiyama, Kanagawa (JP); Keiko Shiraishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 234 days.

(21) Appl. No.: 12/941,310

(22) Filed: Nov. 8, 2010

(65) Prior Publication Data
US 2011/0320842 A1 Dec. 29, 2011

(30) Foreign Application Priority Data

Jun. 29, 2010 (JP) ................................ 2010-148233

(51) Int. Cl.
*G06F 1/00* (2006.01)
(52) U.S. Cl.
USPC .......................................... 713/323; 713/340
(58) Field of Classification Search
USPC ........................................................ 713/340
See application file for complete search history.

(56) References Cited

U.S. PATENT DOCUMENTS

| 5,748,466 | A | * | 5/1998 | McGivern et al. | 700/17 |
| 7,536,574 | B2 | * | 5/2009 | Liu | 713/320 |
| 2007/0063587 | A1 | * | 3/2007 | Suzuki et al. | 307/28 |
| 2011/0004776 | A1 | * | 1/2011 | Tanaka | 713/323 |

FOREIGN PATENT DOCUMENTS

| JP | 2002-63011 A | 2/2002 | |
| JP | 2002-78196 A | 3/2002 | |
| JP | 2004064421 A | 2/2004 | |
| JP | 2004185194 A | 7/2004 | |
| JP | 2007047966 A | 2/2007 | |
| JP | 2007312499 A | 11/2007 | |
| JP | 2009-159051 | * 7/2009 | |
| JP | 2009159051 | * 7/2009 | ................ G06F 1/32 |
| JP | 2009222824 A | 10/2009 | |
| JP | 2010010942 A | 1/2010 | |

OTHER PUBLICATIONS

ON Semiconductors, 2006, Thyristor Theory and Design Considerations, SCILLC HBD855/D Revision 1.*
Japanese Office Action (Notice of Reasons for Rejection) dated Feb. 18, 2014, issued in Japanese application 2010-148233.
Chinese Office Action dated Apr. 30, 2014, issued in Chinese application 201010589314.1.

* cited by examiner

*Primary Examiner* — Kim Huynh
*Assistant Examiner* — Austin Hicks
(74) *Attorney, Agent, or Firm* — Sughrue Mion, PLLC

(57) ABSTRACT

A power supply control device including a mode switching controller, a first power supply section, a second power supply section, a third power supply section, a wiring system opening and closing unit and a controller. During the sleep mode, the first power supply section continues to supply power to a specific control system, the second power supply section shuts off its supply of power, and the third power supply section supplies power to the specific control system by a separate system to the specific control system. The wiring system opening/closing unit sets a power supply wiring system of the commercial power source to an open state or a closed state. When the third power supply section is supplying power during the sleep mode, the controller controls the wiring system opening and closing unit and sets the power supply wiring system of the commercial power supply to the open state.

20 Claims, 7 Drawing Sheets

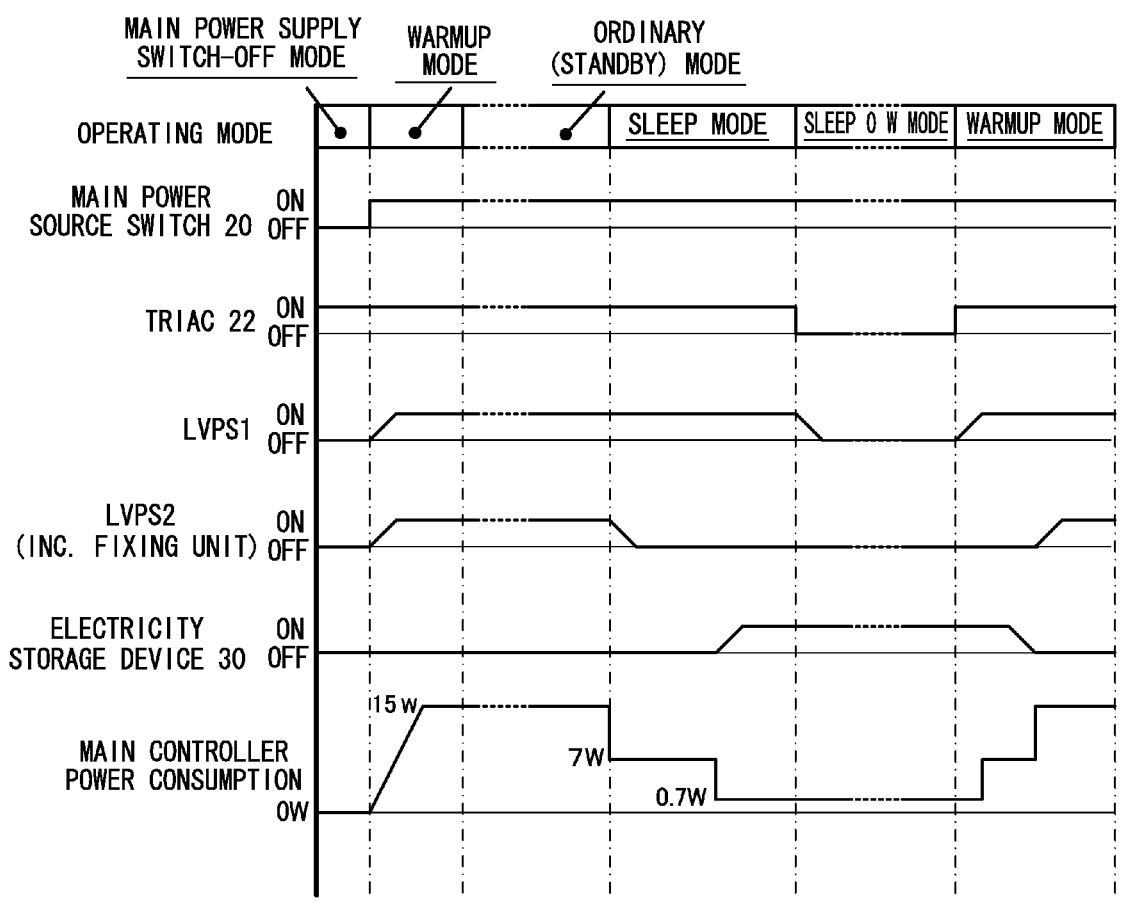

POWER SUPPLY CONTROL DEVICE, IMAGE PROCESSING DEVICE, POWER SUPPLY CONTROL METHOD, AND COMPUTER READABLE MEDIUM

CROSS-REFERENCE TO RELATED APPLICATIONS

This application is based on and claims priority under 35 USC 119 from Japanese Patent Application No. 2010-148233 filed Jun. 29, 2010.

BACKGROUND

1. Technical Field

The present invention relates to a power supply control device, an image processing device, a power supply control method, and a computer readable medium.

2. Related Art

It has been suggested that a power source based on a solar battery and a rechargeable battery or the like be used in an energy saving mode of an image processing device such as a multifunction device or the like.

SUMMARY

There is provided a power supply control device including: a mode switching controller that switches to one of at least an ordinary mode, in which power is received from a commercial power source and the power is the maximum supply capacity, and a sleep mode, in which a lower power than in the ordinary mode is the supply capacity; a first power supply section that continues to supply power to a specific control system during the sleep mode; a second power supply section that shuts off a supply of power during the sleep mode; a third power supply section that, during the sleep mode, supplies power to the specific control system by a separate system from a supply system from the first power supply section to the specific control system; a wiring system opening and closing unit that is provided at a downstream side relative to a power switch that shuts off the power supply of the commercial power source, the wiring system opening and closing unit setting a power supply wiring system of the commercial power source to an open state or a closed state without regard to whether the power switch is on or off; and a controller that, when the third power supply section is supplying power during the sleep mode, controls the wiring system opening and closing unit and sets the power supply wiring system of the commercial power source to the open state.

BRIEF DESCRIPTION OF THE DRAWINGS

Exemplary embodiments of the present invention will be described in detail based on the following figures, wherein:

FIG. 7 is a timing chart illustrating a flow of power supply control for each of modes relating to the present exemplary embodiment.

DETAILED DESCRIPTION

Figure 1:
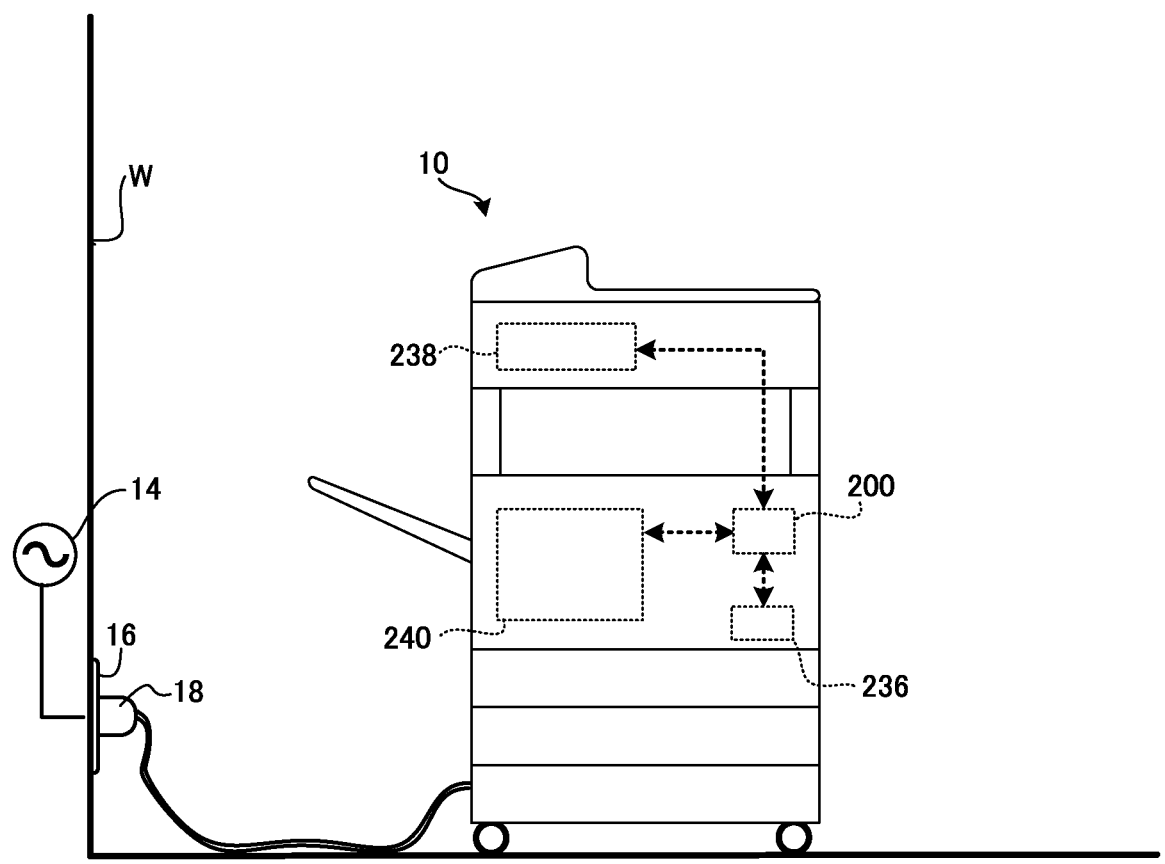
FIG. 1 is a schematic view of an image processing device relating to a present exemplary embodiment.

FIG. 1 illustrates an image processing device 10 relating to a present exemplary embodiment. The image processing device 10 includes an image forming section 240 that forms images on recording paper, an image reading section 238 that reads in images of original documents, and a facsimile (fax) communications control circuit 236. The image processing device 10 includes a main controller 200, which controls the image forming section 240, the image reading section 238 and the facsimile communications control circuit 236, temporarily stores image data of an original document image read by the image reading section 238 in a memory (not illustrated), and sends read image data to the image forming section 240 or the facsimile communications control circuit 236.

An unillustrated network communications circuit such as the Internet or the like is connected to the main controller 200, and an unillustrated telephone circuit is connected to the facsimile communications control circuit 236. The main controller 200 is connected with, for example, a host computer via the network communications circuit and receives image data, and uses the telephone network to send and receive faxes via the facsimile communications control circuit 236.

The image forming section 240 includes a photoreceptor. A charging device, a scanning exposure unit, an image development unit, a transfer unit and a cleaning unit are provided around the photoreceptor. The charging device charges up the photoreceptor uniformly. The scanning exposure unit performs exposure with a light beam on the basis of image data. The image development unit develops an electrostatic latent image formed by the scanning exposure by the scanning exposure unit. The transfer unit transfers an image manifested on the photoreceptor onto recording paper. The cleaning unit cleans the surface of the photoreceptor after the transfer. The image processing device 10 also includes a fixing unit on a conveyance path of the recording paper, which fixes the image onto the recording paper after the transfer.

The image reading section 238 is provided with a document platen on which an original document is positioned, a scanning driving system that scans an image of the document placed on the document platen and illuminates the document with light, and an optoelectronic conversion device such as a CCD or the like that receives light transmitted or reflected in accordance with the scanning of the scanning driving system and converts the light to electronic signals.

-Main Controller 200-

Figure 2:
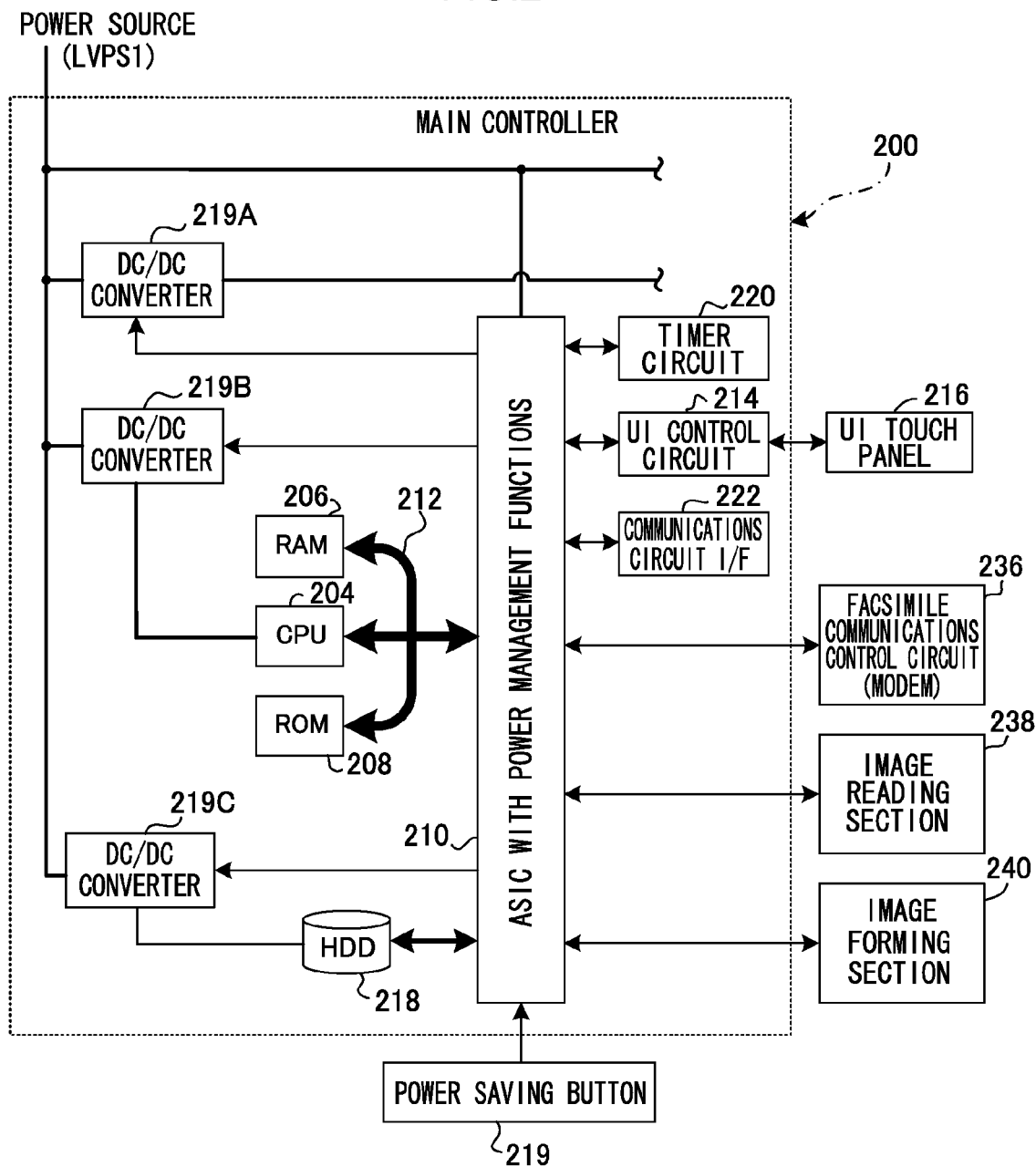
FIG. 2 is a schematic structural view of a main controller and a power source device relating to the present exemplary embodiment.

FIG. 2 is a schematic structural diagram of the main controller 200.

As illustrated in FIG. 2, the main controller 200 includes a CPU 204, a RAM 206, a ROM 208, an application-specific integrated circuit (ASIC) with power management functions 210, and a bus 212 such as a data bus, a control bus or the like that connects these together. A user interface (UI) touch panel 216 is connected to the ASIC with power management functions 210 via a UI control circuit 214. A hard disc (HDD) 218 and a power saving button 219 are also connected to the ASIC with power management functions 210. Functions of the main controller 200 are executed by functions of the ASIC with power management functions 210 being executed and by the CPU 204 operating on the basis of a program stored in the ROM 208, the HDD 218 or the like. Image processing functions may be executed by this program being installed from a storage medium (a CD-ROM, a DVD-ROM or the like) on which the program has been stored, and the CPU 204 operating on the basis of the program.

The power saving button 219 is a hard switch (a switch that is physically operated), and alternatingly instructs the device to turn power saving on and off each time the power saving button 219 is operated by pressing.

The main controller 200 of the present exemplary embodiment instructs the image processing device into a standby mode or a sleep mode. The standby mode is a power supply condition. The sleep mode does not apply to a controller that monitors recovery requests (from the communications circuit, the power saving button, the facsimile circuit, the ASIC with power management functions 210 connected thereto and the like). In the sleep mode, DC/DC converters 219A, 219B and 219C are in power shut-off states in accordance with power source ON/OFF control.

A timer circuit 220 and a communications circuit interface (I/F) 222 are connected to the ASIC with power management functions 210. Devices such as the facsimile communications control circuit 236 (a modem), the image reading section 238 and the image forming section 240 are connected to the main controller 200.

The timer circuit 220 counts up to an initially specified duration, which is a trigger for setting the facsimile communications control circuit 236, the image reading section 238 and the image forming section 240 to a power saving state (a power source non-supply condition).

A power switching controller 12 (see FIG. 3) performs control for switching power source supplies at a time of the sleep mode.

-Power Supply System-

Figure 3:
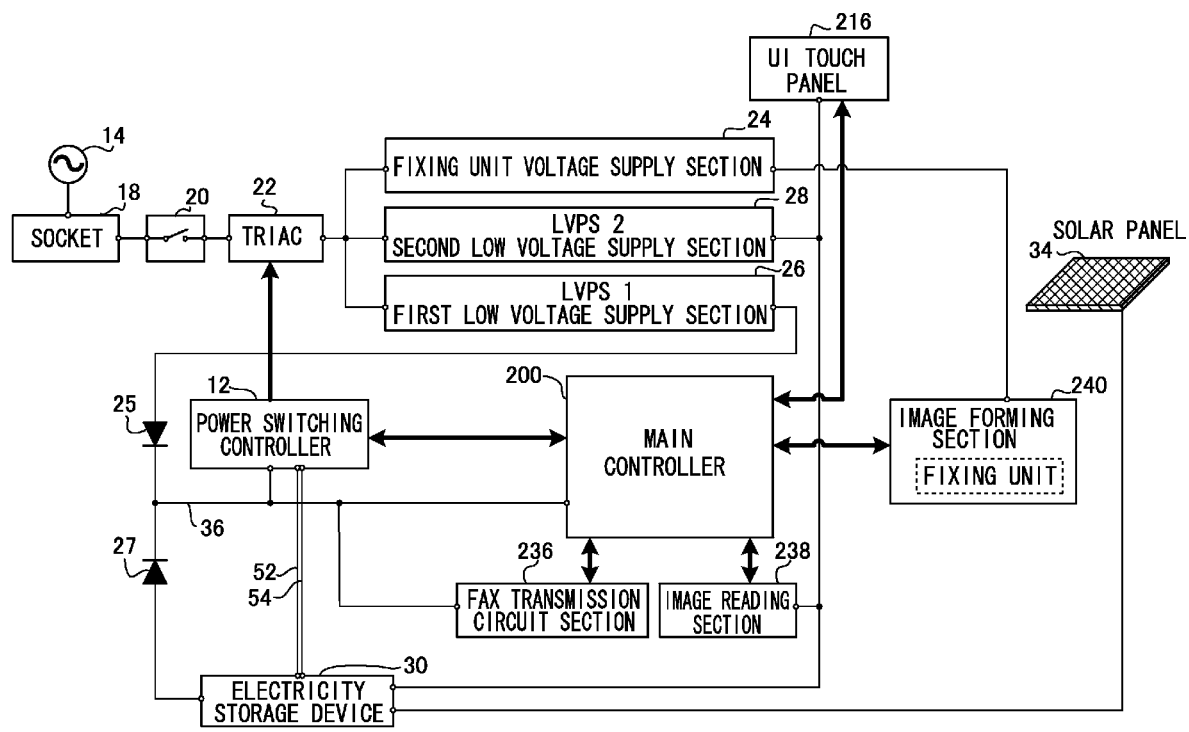
FIG. 3 is a block diagram illustrating power supply systems relating to the present exemplary embodiment.

FIG. 3 shows a diagram of a system for supplying power to the main controller 200 and the respective image processing devices, as an illustration of the present embodiment. Single power source lines are illustrated in FIG. 3, but in actuality there are two or three lines.

When the image processing device 10 is plugged into a socket 18, at a wiring plate 16 of a commercial power source 14 wired to a wall W as illustrated in FIG. 1, the image processing device 10 receives a supply of power from the commercial power source 14.

As illustrated in FIG. 3, the socket 18 is connected to one end of a main power source switch 20. The other end of the main power source switch 20 is connected, via a triac 22, to each of a fixing unit voltage supply section 24, a first low voltage supply section 26 (which may hereinafter be referred to as the LVPS1), and a second low voltage supply section 28 (which may hereinafter be referred to as the LVPS2). The fixing unit voltage supply section 24 is principally employed for heating of a heater (a halogen lamp, an IH heater or the like) that is employed in the fixing unit of the image forming section 240. The LVPS2 is principally employed for operational systems of the image forming section 240, the image reading section 238 and the UI touch panel 216 (i.e., image processing devices).

The LVPS1 is principally employed as a power source for the main controller 200 and the facsimile control circuit 236.

An output line of the LVPS1 is connected to the main controller 200 via a reverse current prevention diode 25. The power switching controller 12 and the facsimile communications control circuit 236 are connected to a connection line 36 that connects the cathode side of the diode 25 with the main controller 200.

The cathode side of a reverse current prevention diode 27, which is connected to an output line from an electricity storage device 30, is connected to the cathode side of the diode 25.

Therefore, power may be supplied to the main controller 200, the facsimile communications control circuit 236 and the power switching controller 12 from both of the LVPS1 and the electricity storage device 30. Even if power is supplied simultaneously from both the LVPS1 and the electricity storage device 30, because of the diodes 25 and 27, there are no reverse currents into either of the LVPS1 and the electricity storage device 30. When power is not to be supplied from the LVPS1 to the power switching controller 12, the power switching controller 12 may be connected to the electricity storage device 30 rather than being connected to the connection line 26.

The LVPS2 is connected to the UI touch panel 216, the image reading section 238, the image forming section 240 and the electricity storage device 30.

A pre-specified amount of electrical energy is stored in the electricity storage device 30. The commercial power source 14, through the LVPS2, is a power source of the electricity storage device 30. In addition, the electricity storage device 30 is charged up by a supply of power generated by a solar panel 34.

In the image processing device 10 of the present exemplary embodiment, a sleep mode that shuts off power from the commercial power source when the respective units are in non-driving states is provided in addition to an ordinary mode that supplies the commercial power to the respective units.

In the ordinary mode, power from the commercial power source 14 is supplied through the LVPS1 to the main controller 200, the facsimile communications control circuit 236 and the power switching controller 12. In addition, power from the commercial power source 14 is supplied through the LVPS2 to the UI touch panel 216, the image reading section 238 and the image forming section 240.

In the sleep mode, only the LVPS1 supplies power. In other words, the supply of power from the LVPS2 is shut off. The fixing unit voltage supply section 24 is put into a power shut-off state during the sleep mode with a view to saving energy.

A monitoring unit 56 of the power switching controller 12 (see FIG. 4) monitors the state of charging of the electricity storage device 30. When the charging state of the electricity storage device 30 is satisfactory, that is, when it is determined that a pre-specified amount of electrical energy is being maintained, the monitoring unit 56 controls the triac 22, sets wiring to the disconnected state and shuts off the power supply from the commercial power source 14. Thus, the power supply from the LVPS1 to the main controller 200, the power switching controller 12 and the facsimile communications control circuit 236 is cut off. Instead, the monitoring unit 56 turns on output of a DC/DC converter 219D that controls an output voltage of the electricity storage device. Because power is being supplied from the electricity storage device 30, the supply of power to the main controller 200, the power switching controller 12 and the facsimile communications control circuit 236 is continued.

Figure 4:
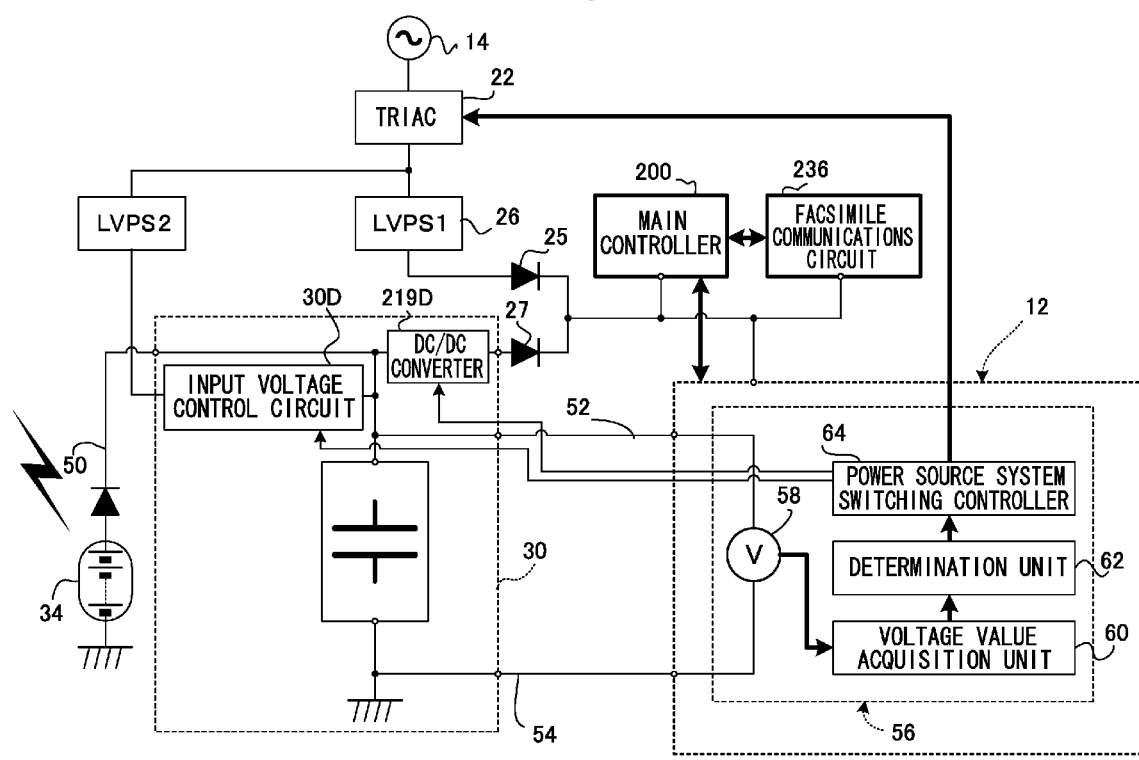
FIG. 4 is a power supply control circuit diagram in which a monitoring section of a power switching controller is a principal constituent.

FIG. 4 shows a functional block diagram for power supply switching control, in which the monitoring unit 56 of the power switching controller 12 is a principal constituent. Portions with the functions illustrated in FIG. 3 are not shown in FIG. 4.

A signal line 50, which leads to a generation portion at which electricity is generated by the solar panel 34, is connected to a positive terminal of the electricity storage device 30. The electricity storage device 30 may employ, besides capacitive electricity storage members such as, for example, condensers or the like, a rechargeable battery. The negative side of the electricity storage device 30 is earthed. Accordingly, the electricity storage device 30 receives supplies of power from the LVPS2 and the solar panel 34 and is charged. An input voltage control circuit 30D of the electricity storage device 30 performs voltage control to match the input voltage from the LVPS2 with the electricity storage device 30, and performs control to turn charging from the LVPS2 on and off.

Voltage detection signal lines 52 and 54 are connected to the two ends of the electricity storage device 30, and are connected to a voltage sensor 58 that constitutes a portion of the monitoring unit 56.

The voltage sensor 58 is connected to a voltage value acquisition unit 60, and voltage values are read in as appropriate.

The voltage value acquisition unit 60 is connected to a determination unit 62. The determination unit 62 compares the voltage values with a pre-specified charging amount threshold (a voltage value), determines whether or not the charging amount of the electricity storage device 30 is sufficient, and sends the results to a power source system switching controller 64.

The power source system switching controller 64 controls the triac 22 and selects whether the power supply from the commercial power source 14 is to be received (a closed state of the power source line) or whether the power supply is to be shut off (an open state of the power source line).

Below, operation of the present exemplary embodiment is described.

Figure 5:
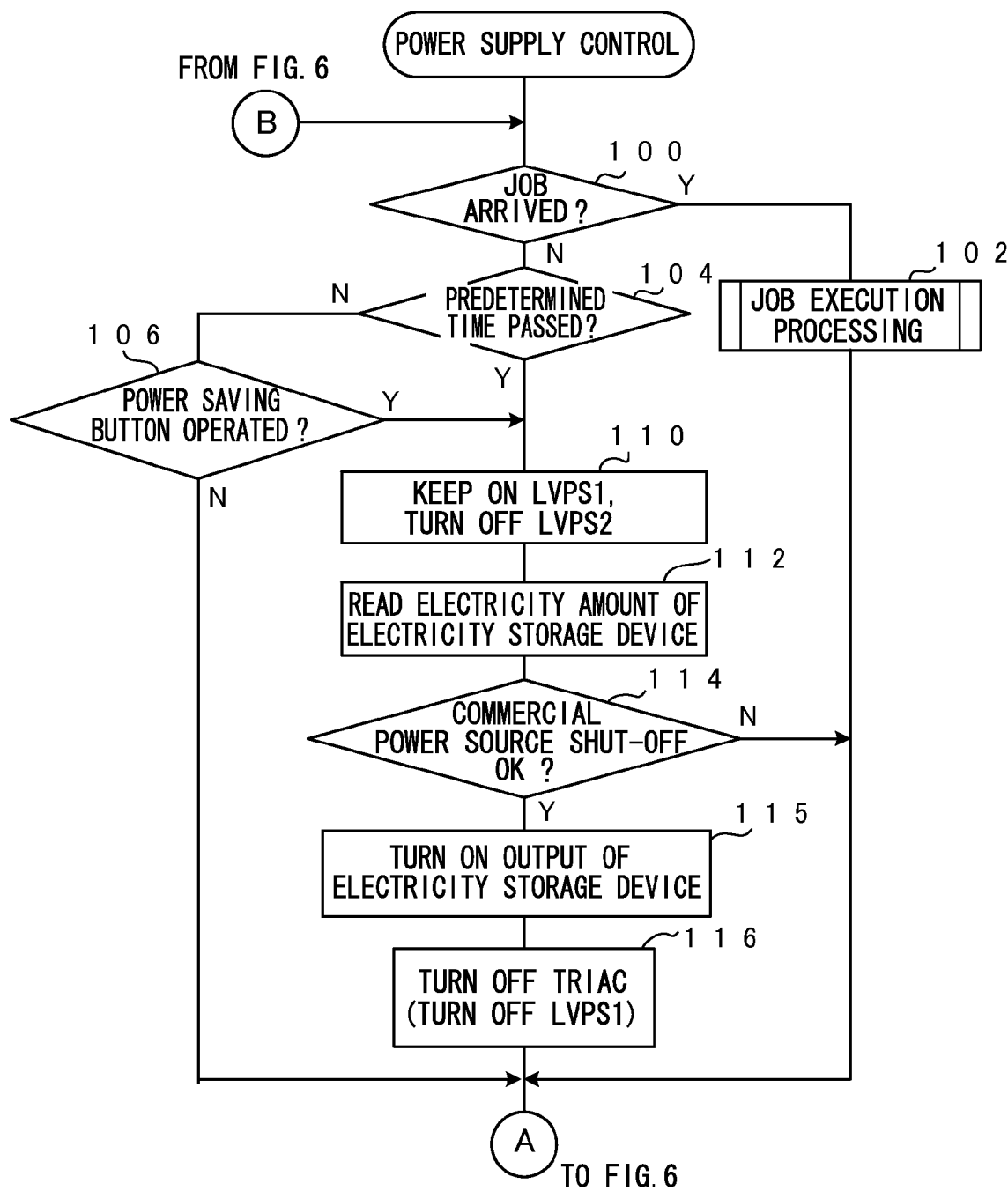
FIG. 5 is a flowchart illustrating (a first part of) a power supply control routine relating to the present exemplary embodiment.
Figure 6:
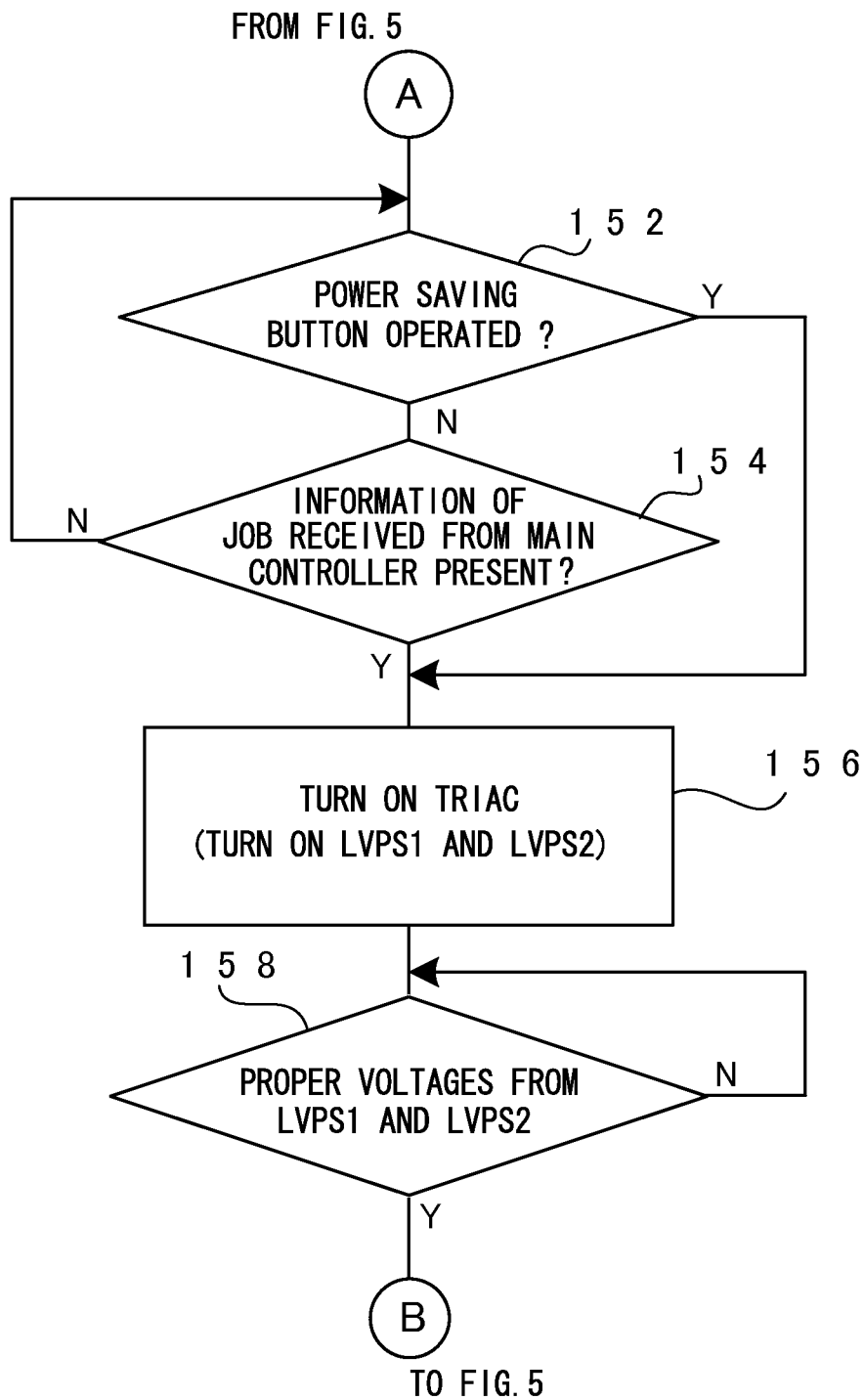
FIG. 6 is a flowchart illustrating (a latter part of) the power supply control routine relating to the present exemplary embodiment.

FIG. 5 and FIG. 6 are a flowchart illustrating a flow of power supply control.

FIG. 5 is power supply control by the main controller 200. In step 100, it is determined whether or not a job has arrived. If this determination is positive, flow control passes to step 102, the job is executed and processed, and this routine ends.

When the determination of step 100 is negative, flow control passes to step 104 and it is determined whether or not a predetermined duration has passed. If the determination in step 104 is negative, flow control passes to step 106 and it is determined whether or not the power saving button 219 has been operated. If the determination in step 106 is negative, this routine ends.

If the determination in step 104 is positive, flow control passes to step 110 and the image processing devices are switched into the sleep mode.

Accordingly, the LVPS1 is kept on (the power supply continues) and the LVPS2 is turned off (the power supply is shut off)

In step 112, the amount of electrical energy in the electricity storage device 30 is read in and flow control passes to step 114. In step 114, it is determined whether or not a sufficient amount of electrical energy is stored for the commercial power source 14 to be shut off (i.e., whether or not the commercial power source may be shut off). If this determination is positive, in step 115, output of the electricity storage device is turned on, flow control passes to step 116, and the triac 22 is turned off and the power source of the LVPS1 is shut off. Hence, power is supplied from the electricity storage device 30 to the main controller 200, the power switching controller 12 and the like.

If the determination in step 114 is negative, that is, if it is determined that the commercial power source 14 may not be shut off (i.e., it is determined that the amount of electrical energy in the electricity storage device 30 is insufficient), the triac 22 is kept on. Hence, in a state in which power from the LVPS1 continues to be supplied to the main controller 200, the power switching controller 12 and the like, this routine ends.

Although not described in this flowchart, the triac 22 may be turned off at a point in time at which the electricity storage device 30 has a sufficient amount of electrical energy, for example, due to charging from the commercial power source 14 or the solar panel 34.

If the determination in step 106 is positive, that is, if the power saving button 219 has been operated, control is the same as when the determination in step 104 is positive (when the predetermined duration has passed), flow control passes to step 110 and the steps described above are executed.

In step 152 of FIG. 6, it is determined whether or not the power saving button 219 has been operated. If this determination is negative, flow control passes to step 154 and it is determined whether or not there is information of a job received from the main controller 200. If the determination in step 154 is negative, flow control returns to step 152, and this repeats until the determination in either of step 152 and step 154 is positive.

When the determination in step 152 or step 154 is positive, flow control passes to step 156, and switching into the ordinary mode is performed. In the ordinary mode, the triac 22 is turned on, and both the LVPS1 and the LVPS2 are turned on (and supply power) with power from the commercial power source 14.

In step 158, it is determined whether or not the main controller 200 has risen into a control-capable condition. The meaning of the phrase "risen into a control-capable condition" includes a determination of whether or not power from the commercial power source 14 is being supplied to the first side of the LVPS1 and a proper voltage (for example, 5 V) is being outputted from the second side. If the determination in step 158 is positive, flow control passes to step 166 and power supply control by the power switching controller 12 is ended.

A flow of power supply control for each mode is described in association with the timing chart of FIG. 7.

The modes in FIG. 7 are, in addition to the ordinary mode in which the LVPS1, the LVPS2 and the fixing unit voltage supply section 24 are all turned on (a standby mode) and the sleep mode in which at least the LVPS2 is turned off, a main power supply switch-off mode and a warmup mode. Furthermore, simple "sleep mode" refers to a time when the LVPS1 is on, and "sleep 0 W mode" refers to a time when the triac 22 and the LVPS1 are off.

When the main power source switch 20 is turned from off to on, the image processing device 10 is switched into the warmup mode, the LVPS1 and the LVPS2 are turned on, and power consumption of the main controller 200 goes from about 0 W to about 15 W.

Then, the image processing device 10 goes into the ordinary mode (standby mode), and image processing in accordance with received jobs and the like are implemented.

When image processing has not been implemented for a certain period or the power saving button 219 is operated, the image processing device 10 switches into the sleep mode. At this time, the LVPS2 turns off and processing for preparing to switch into the sleep mode (sleep switching processing) is executed by the main controller 200, at a power consumption of about 7 W. This processing may require a time as long as one or two minutes.

When the sleep switching processing ends, the CPU 204 is turned off, the power consumption of the main controller 200 falls to about 0.7 W and, subject to the condition that the charging amount of the electricity storage device 30 is sufficient, power is supplied from the electricity storage device 30.

Because the electricity storage device is on in a state in which power consumption is low, power consumption of the electricity storage device may be suppressed. After the electricity storage device has been turned on, the triac 22 is turned off (the LVPS1 is set to the power shut-off state). Hence, the mode is the sleep 0 W mode.

When the electricity storage device 30 is on, before the LVPS1 turns off, there is a distinct period in which both are turned on. Thus, the power supply to the main controller 200 is prevented from being temporarily shut off. There are no reverse flows of current to the electricity storage device 30 or the LVPS1 at this time because of the diodes 25 and 27 of FIG. 3.

Then, when there is a trigger for recovery from the sleep 0 W mode (arriving information of a job or operation of the power saving button), the triac 22 turns on (the LVPS1 turns on), and consequently the main controller 200 performs a CPU reset cancellation operation. However, if the main controller 200 implements the CPU reset cancellation operation simultaneously with the triac 22 turning on, power may be insufficient because power from the LVPS1 has not completely risen.

Therefore, in the present exemplary embodiment, the start of the CPU reset cancellation operation is delayed till after the triac 22 is on (for example, by about 0.3 ms). Then, the reset cancellation operation is started, and the main controller 200 goes to a power consumption of about 7 W. At this time, because the power from the LVPS1 is being assuredly supplied, the power will not be insufficient. In addition, power consumption of the electricity storage device may be suppressed.

In association with the reset cancellation operation of the main controller 200, the power supply from the electricity storage device 30 is shut off. When the main controller 200 finishes the reset cancellation operation, electricity is conducted through the whole board and the power consumption goes to about 15 W.

Then, the LVPS2 turns on (this may be simultaneous with the LVPS1 turning on at the time of the trigger for recovery from sleep) and power is supplied to the image processing devices. The above-described control in accordance with the CPU reset cancellation operation may be implemented by time control to turn the DC/DC converter 219D that supplies power to the CPU 204 on and off.

In the present exemplary embodiment, the monitoring unit 56 is a portion of the power switching controller 12, but this is not to be limiting; the monitoring unit 56 may be provided at the main controller 200. Further, a binary signal may be outputted from the electricity storage device 30, with the pre-specified charging amount as the boundary (for example, output of a high signal when the charging amount is sufficient and a low signal when the charging amount is insufficient). The power switching controller 12 may control the triac 22 on the basis of this binary signal.

It has been illustrated that the power other than the commercial power source 14 is solar energy from the solar panel 34, but this is not to be limiting. As power supply sources other than the commercial power source 14, electricity generated by rotation of motors employed in the image reading section 238 and the image forming section 240, energy recovered during operations and so forth may be employed.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to be suited to the particular use contemplated. It is intended that the scope of the invention be defined by the following claims and their equivalents.

What is claimed is:

1. A power supply control device comprising:
    a mode switching controller that switches to one of at least an ordinary mode, in which power is received from a commercial power source and the power is the maximum supply capacity, a first sleep mode, in which a lower power than in the ordinary mode is the supply capacity, and a second sleep mode in which power consumption is less than that of the first sleep mode;
    a first power supply section that supplies power from the commercial power source, and that is electrically coupled to a specific control system and supplies power to the specific control system in the first sleep mode;
    a second power supply section that supplies power from the commercial power source, and that shuts off a supply of power during the first sleep mode;
    an electricity storage device that is electrically coupled to the specific control system separately from the first power supply section and, during the first sleep mode, supplies power to the specific control system;
    a wiring system opening and closing unit that is provided at a downstream side relative to a power switch that shuts off the power supply from the commercial power source, the wiring system opening and closing unit setting a power supply wiring system from the commercial power source to an open state or a closed state without regard to whether the power switch is on or off;
    a power controller that turns on the first power supply section and turns off the second power supply section during the first sleep mode when a predetermined duration has been passed after a job has been completed during the ordinary mode;
    a reading section that reads an amount of electrical energy stored in the electricity storage device during the first sleep mode;
    a determination section that determines whether the electricity storage device stores an amount of electrical energy which maintains a sleep mode with a power which is supplied only from the electricity storage device while shutting down the commercial power source, based on the read amount of stored electrical energy;
    an electricity storage device output controller that turns on an output of the electricity storage device when the determination section has made an affirmative determination; and
    a controller that turns off the wiring system opening and closing unit to turn off the first power supply section to switch to the second sleep mode when the determination section has made the affirmative determination wherein during the second sleep mode, the specific control system is supplied with power only from the electricity storage device.

2. The power supply control device according to claim 1, wherein
    during the first sleep mode, the specific control system is controlled such that internal power consumption thereof falls in stages, and
    after the internal power consumption of the specific control system falls below a pre-specified value, the electricity storage device supplies power to the specific control system.

3. The power supply control device according to claim 2, wherein the specific control system comprises a main controller that sets the power supply from the first power supply section as required, and a sub controller that monitors for a recovery trigger during the second sleep mode, and
whether or not the internal power consumption of the specific control system has fallen below the pre-specified value is determined by functions of the main controller stopping.

4. The power supply control device according to claim 1, wherein, with recovery from the second sleep mode to the ordinary mode as a trigger, the controller sets the power supply wiring system to the closed state.

5. The power supply control device according to claim 1, wherein, when the specific control system is switched from a state of being operated by power from the electricity storage device to a supply of power from the first power supply section, the specific control system is controlled such that the internal power consumption thereof rises.

6. The power supply control device according to claim 5, wherein the specific control system is controlled such that the internal power consumption of the specific control system rises after at least a rising time of the power supply from the first power supply section has passed.

7. A power supply control device according to claim 1, wherein the power supply control divice is connected to an image processing device comprising:
an image reading section that reads an image of an original document and generates image data;
an image forming section that forms an image on recording paper on the basis of image data; and
a facsimile communications section that sends and receives image data to and from outside the image processing device.

8. The power supply control device according to claim 7, wherein
during the first sleep mode, the specific control system is controlled such that internal power consumption thereof falls in stages, and
after the internal power consumption of the specific control system falls below a pre-specified value, the electricity storage device supplies power to the specific control system.

9. The power supply control device according to claim 8, wherein the specific control system comprises a main controller that sets the power supply from the first power supply section as required, and a sub controller that monitors for a recovery trigger during the second sleep mode, and
whether or not the internal power consumption of the specific control system has fallen below the pre-specified value is determined by functions of the main controller stopping.

10. The power supply control device according to claim 7, wherein, with recovery from the second sleep mode to the ordinary mode as a trigger, the controller sets the power supply wiring system to the closed state.

11. The power supply control device according to claim 7, wherein, when the specific control system is switched from a state of being operated by power from the electricity storage device to a supply of power from the first power supply section, the specific control system is controlled such that the internal power consumption thereof rises.

12. The power supply control device according to claim 11, wherein the specific control system is controlled such that the internal power consumption of the specific control system rises after at least a rising time of the power supply from the first power supply section has passed.

13. A power supply control method comprising:
switching to one of at least an ordinary mode, in which power is received from a commercial power source and the power is the maximum supply capacity, a first sleep mode, in which a lower power than in the ordinary mode is the supply capacity, and a second sleep mode in which power consumption is less than that of the first sleep mode;
controlling such that a first power supply section that supplies power from the commercial power source and that is electrically coupled to a specific control system supplies power to the specific control system in the first sleep mode;
controlling such that a second power supply section that supplies power from the commercial power source and shuts off a supply of power during the sleep mode;
controlling such that, during the first sleep mode, an electricity storage device that is electrically coupled to the specific control system separately from the first power supply section, supplies power to the specific control system;
controlling such that a wiring system opening and closing unit, which is provided at a downstream side relative to a power switch that shuts off the power supply from the commercial power source, sets a power supply wiring system from the commercial power source to an open state or a closed state without regard to whether the power switch is on or off;
turning on the first power supply section and turning off the second power supply section during the first sleep mode when a predetermined duration has been passed after a job has been completed during the ordinary mode;
reading an amount of electrical energy stored in the electricity storage device during the first sleep mode;
determining whether the electricity storage device stores an amount of electrical energy which maintains a sleep mode with a power which is supplied only from the electricity storage device while shutting down the commercial power source, based on the read amount of stored electrical energy; and
in response to an affirmative determination, turning on an output of the electricity storage device and turning off the wiring system opening and closing unit to turn off the first power supply section to switch to the section sleep mode wherein the specific control system is supplied with power only from the electricity storage device.

14. A non-transitory computer readable medium storing a program causing a computer to execute a process for power supply control processing, the process comprising:
switching to one of at least an ordinary mode, in which power is received from a commercial power source and the power is the maximum supply capacity, a first sleep mode, in which a lower power than in the ordinary mode is the supply capacity, and a second sleep mode in which power consumption is less than that of the first sleep mode;
controlling such that a first power supply section that supplies power from the commercial power source and that is electrically coupled to a specific control system supplies power to the specific control system in the first sleep mode;
controlling such that a second power supply section that supplies power from the commercial power source shuts off a supply of power during the first sleep mode;
controlling such that, during the first sleep mode, an electricity storage device that is electrically coupled to the specific control system separately from the first power supply section, supplies power to the specific control system;

controlling such that a wiring system opening and closing unit, which is provided at a downstream side relative to a power switch that shuts off the power supply from the commercial power source, sets a power supply wiring system from the commercial power source to an open state or a closed state without regard to whether the power switch is on or off;

turning on the first power supply section and turning off the second power supply section during the first sleep mode when a predetermined duration has been passed after a job has been completed during the ordinary mode;

reading an amount of electrical energy stored in the electricity storage device during the first sleep mode;

determining whether the electricity storage device stores an amount of electrical energy which maintains a sleep mode with a power which is supplied only from the electricity storage device while shutting down the commercial power source, based on the read amount of stored electrical energy; and in response to an affirmative determination, turning on an output of the electricity storage device and turning off the wiring system opening and closing unit to turn off the first power supply section to switch to the section sleep mode wherein the specific control system is supplied with power only from the electricity storage device.

15. A power supply control device that operates at least in an ordinary mode, a first sleep mode and a second sleep mode, the power supply control device comprising:

a main power switch that receives power from a commercial power supply;

a triac that is electrically coupled to the main power switch;

an electricity storage device that is electrically coupled to a specific control system;

a first power supply section that is electrically coupled to the triac and electrically coupled to the specific control system separately from the electricity storage device, that receives power from the triac and that supplies the power to the specific control system in the ordinary mode and the first sleep mode;

a second power supply section that is electrically coupled to the triac, receives power from the triac, supplies the power to an operational system and the electricity storage device in the ordinary mode, and shuts off supply of the power to the function section and the electricity storage device in the first and second sleep mode; and a power switching controller that, when a predetermined duration has been passed after a job has been completed in the ordinary mode, turns on the first power supply section and turns off the second power supply section, wherein the power switching controller reads an amount of electrical energy stored in the electricity storage device, determines whether the electricity storage device stores an amount of power capable of maintaining a sleep mode without using the commercial power source, based on the read amount of stored electrical energy during the first sleep mode, and when the electricity storage device is determined to store an amount of energy capable to maintain the sleep mode without using the commercial power source, turns off the triac to switch to the second sleep mode.

16. The power supply control device according to claim 15, wherein the electricity storage device is electrically connected to an external power source that is a different source from the commercial power source.

17. The power supply control device according to claim 1, wherein the electricity storage device is charged from at least one of the second power supply section and a solar panel.

18. The power supply control device according to claim 1, wherein the specific control system comprises a power switching controller and a communication control circuit.

19. An image processing device comprising:

a solar panel;

an image reading section that reads an image of an original document and generates image data;

an image forming section that forms an image on recording paper on the basis of image data;

a facsimile communications section that sends and receives image data to and from outside the image processing device; and a power supply control device comprising:

a mode switching controller that switches to one of at least an ordinary mode, in which power is received from a commercial power source and the power is the maximum supply capacity, a first sleep mode, in which a lower power than in the ordinary mode is the supply capacity, and a second sleep mode in which power consumption is less than that of the first sleep mode;

a first power supply section that supplies power from the commercial power source and that is electrically coupled to a specific control system and supplies power to the specific control system in the first sleep mode;

a second power supply section that supplies power from the commercial power source and that shuts off a supply of power during the sleep mode;

an electricity storage device that is electrically coupled to the specific control system separately from the first power supply section and, during the sleep mode, supplies power to the specific control system;

a wiring system opening and closing unit that is provided at a downstream side relative to a power switch that shuts off the power supply from the commercial power source, the wiring system opening and closing unit setting a power supply wiring system from the commercial power source to an open state or a closed state without regard to whether the power switch is on or off;

a power controller that turns on the first power supply section and turns off the second power supply section during the first sleep mode when a predetermined duration has been passed after a job has been completed during the ordinary mode;

a reading section that reads an amount of electrical energy stored in the electricity storage device during the first sleep mode;

a determination section that determines whether the electricity storage device stores an amount of electrical energy which maintains a sleep mode with a power which is supplied only from the electricity storage device while shutting down the commercial power source, based on the read amount of stored electrical energy;

an electricity storage device output controller that turns on an output of the electricity storage device when the determination section has made an affirmative determination; and a controller that turns off the wiring system opening and closing unit to turn off the first power supply section to switch to the second sleep mode when the determination section has made the affirmative determination wherein the specific control system is supplied with power only from the electricity storage device.

20. The power supply control device according to claim 19, wherein the electricity storage device is charged from at least one of the second power supply section and the solar panel.

* * * * *